Sept. 3, 1935.  G. F. LINDE  2,013,518
AIR WASHER AND STERILIZER
Original Filed June 4, 1934
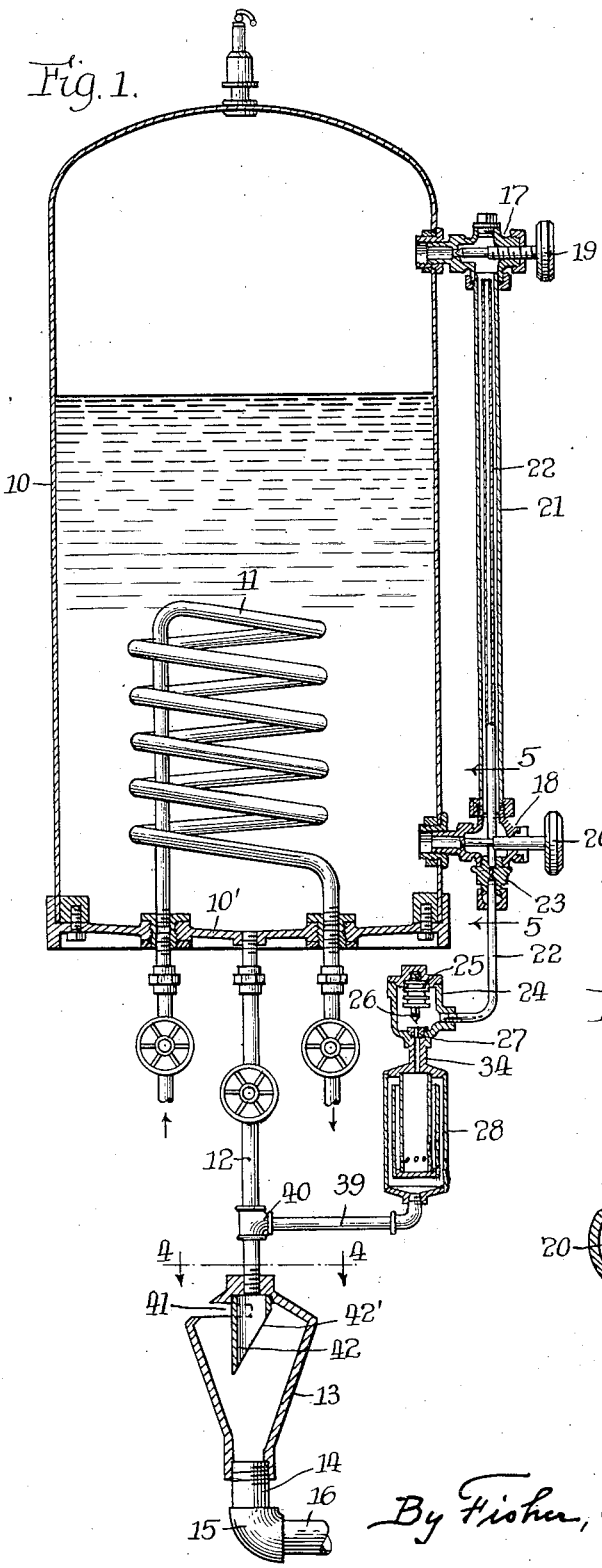
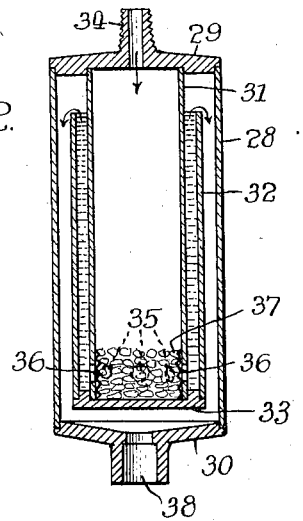
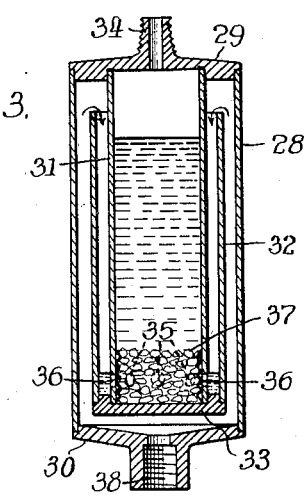
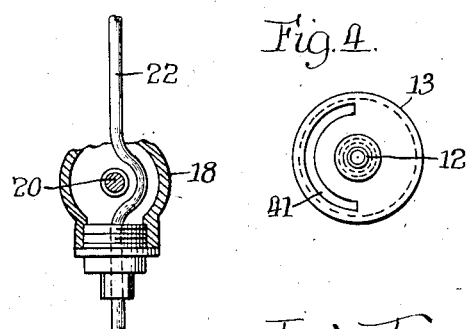
Inventor:
Gustave F. Linde,
By Fisher, Clapp, Soans + Pond
Attys.

Patented Sept. 3, 1935

2,013,518

UNITED STATES PATENT OFFICE 2,013,518

AIR WASHER AND STERILIZER

Gustave F. Linde, Madison, Wis., assignor to Scanlan-Morris Company, Madison, Wis., a corporation of Wisconsin Original application June 4, 1934, Serial No. 728,847. Divided and this application October 17, 1934, Serial No. 748,620

3 Claims. (Cl. 261—123)

This invention relates to the art of air washing devices, and is a division of an application filed by me on the fourth day of June, 1934, Serial No. 728,847, now Patent No. 1,998,679 dated April 23, 1935, for improvements in liquid sterilizers.

In the aforesaid application I have disclosed a device for use in hospitals and bacteriological laboratories for sterilizing liquids in a tank by the application of heat to raise the liquid to a sterilizing temperature, said application including means for sterilizing the usual gauge glass and also a device for washing and sterilizing the air that enters the tank as the sterilized water is drawn off. It is this latter device that forms the subject matter of the present application; and, although it is capable of useful employment in other situations than as an adjunct of a liquid sterilizer, it has been designed mainly for that purpose, and I have accordingly, in the accompanying drawing illustrated it in association with a liquid sterilizer in order that its function, mode of operation, and utility in connection with a liquid sterilizer may be better understood.

Referring to the drawing:

Fig. 1 is a vertical sectional view of the liquid sterilizer of my aforesaid application, showing the air washer and sterilizer associated therewith and forming a part thereof.

Fig. 2 is an enlarged sectional detail of the air washer and sterilizer, showing its condition when steam from the sterilizing tank is discharging therethrough.

Fig. 3 is a similar view of the air washer and sterilizer, showing its condition when steam is being condensed in the sterilizing tank, or the sterilized water is being drawn therefrom, or both, and air is being admitted through the washer and sterilizer to the sterilizing tank under the vacuum pull in the latter.

Fig. 4 is a plan section, on line 4—4 of Fig. 1, of a sanitary air gap fitting at the lower end of the system through which the incoming air is admitted to the air washer and sterilizer.

Fig. 5 is a sectional detail on the line 5—5 of Fig. 1.

Referring to the drawing, 10 designates a tank adapted to contain a body of water or other liquid to be sterilized, the liquid being heated by any suitable means such, for instance, as a steam coil 11. From the center of the concave bottom wall 10' of the tank 10 a valve-controlled drain pipe 12 leads into a waste fitting 13, the lower end of which communicates by a short pipe section 14 and elbow 15 with a drain pipe 16 leading to the sewer. The purpose of the last described parts, is, of course, to drain off, from time to time, any sediment that may accumulate in the bottom of the tank 10.

In one side of the tank 10 are mounted upper and lower standard gauge glass fittings 17 and 18 equipped with manually operated valves 19 and 20, respectively, which are normally open and closed only in an emergency such as the breaking of the gauge glass, and between these fittings is mounted the gauge glass 21. Within the gauge glass 21 and coaxial therewith is the upper section of a steam pipe 22, the lower end of which upper section may be mounted in the axially bored lower plug 23 of the fitting 18, the lower portion of the upper section of pipe 22 being bent laterally to clear the needle valve 20, as shown in Fig. 5.

The upper end of the upper section of steam pipe 22 communicates freely with the chamber of the upper gauge fitting 17 so that it is in free communication with the interior of the upper portion of the tank 10. The upper end of the lower section of pipe 22 is mounted in the plug 23 and its lower end connects into a thermostatic steam trap 24 of the well known type wherein a bellows diaphragm 25, that is expansible by the heat of the steam, carries a valve 26 cooperating with a valve seat 27 in the bottom of the trap so that, shortly after the steam enters the trap the valve 26 is closed on its seat by the diaphragm 25 so as to prevent further escape of steam.

Connected into the lower end of the steam trap 24 is the air washer and sterilizer, the structural details of which are best illustrated in Figs. 2 and 3, and comprise an outer steam and air tight casing 28 closed at its upper and lower end by headers 29 and 30, an inner tube 31 secured at its open upper end in the header 29, and an outer tube 32 encircling the inner tube 31, open at its upper end, and at its lower end closed by a cap 33 in which the lower end of the inner tube 31 is seated and sealed. The upper header 29 of the washer and sterilizer is equipped with a threaded nipple 34 that screws into the lower end of the steam trap 24, and in the lower portion of the inner tube 31 is a ring of holes 35 that may be covered with screens 36 where, as is preferable, the inner tube 31 is supplied with a body of glass or porcelain beads 37, which are used to break up bubbles in the air that is passing through the body of water in the tube 31.

The lower header 30 of the air washer and sterilizer is formed with a tapped nipple 38 to receive a pipe 39 that communicates with the drain pipe 12 through a T-fitting 40 in the latter.

The sanitary air gap drain fitting 13, which is preferably employed, is a hollow inverted pear-shaped structure tapped to receive the threaded lower end of the drain pipe 12, and formed in one side thereof with a substantially semi-circular air inlet opening 41, which straddles an internal baffle 42 mounted in the upper end of the fitting, the baffle 42 having a biased open side 42' remote from the air gap or inlet 41, so that sediment deposited from the pipe 12 cannot splash on and thus foul or obstruct the air gap or mouth 41.

Briefly describing a cycle of operation, the tank 10 is filled in the conventional manner and steam turned on to sterilize the water. The air above the water is expanded by the heat and escapes through tube 22 in the gauge glass, through the thermostatic trap 24 and through the washer and sterilizer 28 to the sanitary air gap fitting 13 which is open to the air through the opening 41. This air in its escape depresses the liquid level in the inner tube 31 down to the holes 35, causing a partial overflow of the water in the washer and sterilizer, as shown in Fig. 2. During the sterilizing period the thermostatic trap is intermittently draining steam condensate into the inner tube 31, replenishing the condensate blown off by the air. At the end of the sterilizing period, when the steam is turned off, and the water in the tank begins to cool, stopping the flow of steam through the pipe 22, the natural radiation of the thermostatic trap will cool the expanding element in the trap, causing the trap valve to open, allowing air to flow into the sterilizer tank as the steam condenses or water is drawn therefrom. When air flows through the washer and sterilizer due to reduced pressure in the sterilizing tank, the atmospheric pressure will cause the liquid level to be lowered between the inner and outer tubes and to the level of the holes 35 in the inner tube. This, of course, raises the liquid level in the inner tube, as is shown in Fig. 3. After the level between the inner and outer tubes has been lowered to the holes 35, air enters through the holes and bubbles up through the liquid column washing and sterilizing the air. The liquid in the inner tube 31 forms an effective seal against unfiltered air entering the sterilizer tank, since the air can enter the tank only through the body of water in the tube 31. When steam is formed in the sterilizer, a considerable quantity thereof flows through the system before the diaphragm in the thermostatic trap expands sufficiently to close the trap; and this steam flowing through the washer and sterilizer sterilizes it effectively. After the trap closes, the steam condensate drains into the washer and sterilizer as previously described.

The described device not only washes the incoming air but also sterilizes it for this reason. Pure air carries no bacteria, but most air is more or less dust laden, and the bacteria are found in the dust. Hence, since the device washes out the dust, it also eliminates the bacteria and thus renders the air sterile.

I claim:

1. As an adjunct for a liquid sterilizing tank, a device for washing and sterilizing the air that enters the tank as the water is drawn off and adapted to be sterilized by steam discharged therethrough from said tank, comprising a casing having top and bottom closures, said top closure having an air outflow duct for communication with a pipe leading into said tank and said bottom closure having an air inflow duct, an inner tube within said casing closed at its upper end by said top closure and communicating with the air outflow duct thereof, said inner tube formed with holes near its lower end, an outer tube encircling said inner tube with clearance and approximately the full length of said inner tube and open at its upper end below said top closure, and a closure for the lower ends of said tubes and the annular clearance space therebetween above and spaced from said bottom closure.

2. As an adjunct for a liquid sterilizing tank, a device for washing and sterilizing the air that enters the tank as the water is drawn off and adapted to be sterilized by steam discharged therethrough from said tank, comprising a casing, top and bottom headers closing the upper and lower ends of said casing, said top header having a central air outflow duct for communication with a pipe leading into said tank and said bottom header having a central air inflow duct, an inner tube within and coaxial with said casing closed at its upper end by said top header and communicating with the air outflow duct thereof, said inner tube formed with a row of holes near its lower end, an outer tube coaxial with and encircling said inner tube with clearance and approximately the full length of said inner tube and open at its upper end below said top header, a common closure for the lower ends of said tubes and the annular clearance space therebetween above and spaced from said lower header, and a body of bubble dividing material in the lower portion of said inner tube covering said holes.

3. As an adjunct for a liquid sterilizing tank, a device for washing and sterilizing the air that enters the tank as the water is drawn off and adapted to be sterilized by steam discharged therethrough from said tank, comprising a casing, top and bottom headers closing the upper and lower ends of said casing, said top header having an air outflow duct for communication with a pipe leading into said tank and said bottom closure having an air inflow duct, an inner tube within said casing closed at its upper end by said top header and communicating with the air outflow duct thereof, said inner tube formed with holes near its lower end, an outer tube encircling said inner tube with clearance and open at its upper end below said header, the length of each of said tubes being greater than its diameter, and a closure for the lower ends of said tubes and the annular clearance space therebetween.

GUSTAVE F. LINDE.